(12) United States Patent
Hirose et al.

(10) Patent No.: US 6,723,422 B1
(45) Date of Patent: Apr. 20, 2004

(54) COMPOSITE REVERSE OSMOSIS MEMBRANE AND PROCESS FOR PREPARING THE SAME

(75) Inventors: Masahiko Hirose, Shiga (JP); Hiroki Ito, Kusatsu (JP); Tomomi Ohara, Kusatsu (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/462,109

(22) PCT Filed: Jun. 29, 1998

(86) PCT No.: PCT/JP98/02954

§ 371 (c)(1),
(2), (4) Date: Dec. 30, 1999

(87) PCT Pub. No.: WO99/01208

PCT Pub. Date: Jan. 14, 1999

(30) Foreign Application Priority Data

Jul. 2, 1997 (JP) ............................................. 9/176904

(51) Int. Cl.$^7$ .................... B32B 20/00; B01D 61/00
(52) U.S. Cl. ................... 428/319.3; 428/319.7; 428/318.4; 210/652; 210/653; 210/500.24; 210/500.27; 210/500.38; 210/506
(58) Field of Search .................... 428/319.3, 319.7, 428/318.4; 210/500.24, 652, 653, 500.27, 500.38, 506

(56) References Cited

U.S. PATENT DOCUMENTS

| 4,277,344 A | 7/1981 | Cadotte ................. 210/654 |
| 4,340,480 A | 7/1982 | Pall et al. ................ 210/490 |
| 4,520,044 A | 5/1985 | Sundet ................... 427/244 |
| 4,529,646 A | 7/1985 | Sundet ................. 428/315.5 |
| 4,761,234 A | 8/1988 | Uemura et al. ........ 210/500.38 |
| 4,767,645 A | 8/1988 | Linder et al. ............ 427/386 |
| 4,778,596 A | 10/1988 | Linder et al. ............ 210/638 |
| 4,833,014 A | 5/1989 | Linder et al. ........... 428/308.4 |
| 4,872,984 A | * 10/1989 | Tomaschke ............ 210/500.38 |
| 4,888,116 A | * 12/1989 | Cadotte et al. ........ 210/500.38 |
| 4,894,165 A | * 1/1990 | Fibiger et al. ............. 210/654 |
| 4,909,943 A | * 3/1990 | Fibiger et al. ......... 210/500.27 |
| 4,948,507 A | 8/1990 | Tomaschke ............ 210/500.38 |
| 5,178,766 A | * 1/1993 | Ikeda et al. .............. 210/652 |
| 5,733,602 A | 3/1998 | Hirose et al. .............. 427/245 |
| 5,798,078 A | * 8/1998 | Myers ..................... 264/446 |
| 5,989,426 A | * 11/1999 | Hirose et al. ............ 210/257.2 |
| 6,171,497 B1 | * 1/2001 | Hirose et al. .......... 210/500.38 |

FOREIGN PATENT DOCUMENTS

| EP | 0316525 A2 | * 8/1988 |
| EP | 0 316 525 A2 | 5/1989 |
| EP | 0 752 266 A2 | 1/1997 |
| JP | 61-46203 | 3/1986 |
| JP | 63-12310 | 1/1988 |
| JP | 63-178805 | 7/1988 |
| JP | 63-218208 | 9/1988 |

OTHER PUBLICATIONS

Chinese Office Action dated Nov. 29, 2002, 5 pages.
Patent Abstracts of Japan, Publication No. 61046203 A, Date of Publication Mar. 6, 1986, 1 page.
Patent Abstracts of Japan, Publication No. 63178805 A, Date of Publication Jul. 22, 1988, 1 page.
Patent Abstracts of Japan, Publication No. 63218208 A, Publication Date Sep. 12, 1988, 1 page.
Patent Abstracts of Japan, Publication No. 63012310 A, Publication Date Jan. 19, 1988, 1 page.

* cited by examiner

*Primary Examiner*—Daniel Zirker
*Assistant Examiner*—Victor S. Chang
(74) *Attorney, Agent, or Firm*—Rosenthal & Osha L.L.P.

(57) ABSTRACT

A composite reverse osmosis membrane is described, which includes a polyamide skin layer on a porous support, with a contact angle between the polyamide skin layer surface and water of 45° or less. The composite reverse osmosis membrane has a high salt rejection and also a high water permeability. This composite reverse osmosis membrane is produced by forming a polyamide skin layer on a porous support having the steps of: forming a layer on the porous support by coating a solution A including one or more compounds having at least two reactive amino groups; contacting the layer with a solution B comprising one or more polyfunctional acid halide compounds; and subsequently, contacting the layer with a solution C comprising the polyfunctional acid halide compound of a higher concentration than the solution C. The concentration of the polyfunctional acid halide compound in the solution C is preferably at least 1.2 times of the solution B.

5 Claims, No Drawings

COMPOSITE REVERSE OSMOSIS MEMBRANE AND PROCESS FOR PREPARING THE SAME

TECHNICAL FIELD

The present invention relates to a composite reverse osmosis membrane for selectively separating components in a liquid mixture, and a method of producing the membrane. More specifically, the present invention relates to a composite reverse osmosis membrane having a porous support on which a polyamide skin layer mainly comprising polyamide is formed to provide both high salt rejection and high permeability, and a method of producing the same.

Such a composite reverse osmosis membrane can be used for many purposes, including the manufacture of ultra-pure water and the desalination of sea water or brackish water. This membrane also can be used to remove contamination from a source or withdraw purified materials from contaminated dyeing waste or electrochemical deposition coating waste. Such wastes may cause pollution. Thus the present invention will clean contaminated water to be reused. The membrane of the present invention also can be used for other purposes like condensing effective components for food.

BACKGROUND ART

Conventionally, composite reverse osmosis membranes have been known as reverse osmosis membranes which differ in structure from asymmetric reverse osmosis membranes. Such composite reverse osmosis membranes are produced by forming active thin films (skin layers) which possess the ability to selectively separate materials, on porous supports.

Applications disclose membranes comprising polyamide obtainable by interfacial polymerization between polyfunctional aromatic amines and polyfunctional aromatic acid halide compounds formed on porous supports. The examples of such applications are, JP-A-(Unexamined Published Japanese Patent Application) 55-147106, JP-A-62-121603, JP-A-63-218208, and JP-A-2-187135. Other prior art references disclose composite reverse osmosis membranes wherein skin layers comprising polyamide are formed on porous supports, and the polyamide is obtained by an interfacial polymerization of a polyfunctional aromatic amine and a polyfunctional alicyclic acid halide compound (cf. JP-A-61-42308).

The composite reverse osmosis membranes described above have a high desalination property and a high water permeability, but it is desirable to improve the water permeability while keeping the high desalination property from the standpoint of the efficiency and so on. For these requirements, various kinds of additives are proposed e.g., in JP-A-63-12310. However, in the conventional composite reverse osmosis membranes, the improvement of the properties of the composite reverse osmosis membranes are still insufficient.

JP-A-63-178805 discloses a method of forming a membrane in a two-stage reaction. In this method, a polyfunctional reaction reagent of a low concentration is added in the second stage. A composite reverse osmosis membrane obtained in this method is improved slightly in the salt rejection, but the permeation speed is lowered instead. This method cannot provide a composite reverse osmosis membrane to conform to the requirements.

The present invention aims to provide a composite reverse osmosis membrane having a high salt rejection and high water permeability, and a method of producing the same.

DISCLOSURE OF THE INVENTION

In order to accomplish these objects, a composite reverse osmosis membrane of the present invention comprises a polyamide skin layer formed on a porous support, and the contact angle between the polyamide skin layer surface and water is defined not to exceed 45°.

When the contact angle is no more than 45°, a high salt rejection is maintained, a flux is improved and thus, the membrane has excellent water permeability. The contact angle is preferably 40° or less.

In the present invention, the contact angle is measured in the following manner. First, the polyamide skin layer surface is cleansed and dried. Then, pure water is dropped on the surface in order to measure the angle (the internal angle of the water drop) formed by the water drop and the polyamide skin layer. The angle is measured preferably about 15 seconds after the dropping of the water.

The composite reverse osmosis membrane preferably includes a polyamide skin layer formed by a reaction of one or more compounds having at least two reactive amino groups and one or more polyfunctional acid halide compounds having at least two reactive acid halide groups.

Preferably, the composite reverse osmosis membrane provides a salt rejection of at least 98% and a permeate flow rate of at least 0.5 $m^3/m^2 \cdot day$ when evaluated by using feed water having pH 6.5 containing 0.05 weight % of salt at an operation pressure of 5 $kgf/cm^2$ and a temperature of 25° C. If the salt rejection and the permeate flow rate are within these ranges, ions can be removed if an actual operation pressure is low as 5 $kgf/cm^2$ or less, for example, about 3 $kgf/cm^2$. Therefore, facilities comprising the composite reverse osmosis membranes can be built by using pipes made of inexpensive materials such as polyvinyl chloride. This offers a significant cost advantage. The composite reverse osmosis membrane can be used at city water level pressures. Preferably, the salt rejection is at least 98%, the permeate flow rate is at least 0.6 $m^3/m^2 \cdot day$ under the above-identified condition. Most preferable is if the salt rejection is at least 99% and the permeate flow rate is at least 0.7 $m^3/m^2 \cdot day$.

A method of producing a composite reverse osmosis membrane of the present invention includes the steps of:

forming a layer by coating on a porous support a solution A comprising one or more compounds having at least two reactive amino groups;

contacting this layer with a solution B comprising one or more polyfunctional acid halide compounds; and further contacting the layer with another solution C comprising one or more polyfunctional acid halide compounds of a concentration higher than the solution B in order to form a polyamide skin layer on the porous support.

The above-identified composite reverse osmosis membrane can be produced in this method.

The composite reverse osmosis membrane of the present invention is preferably produced in this method, but it is not limited thereto.

In the producing method, preferably, the concentration of the polyfunctional acid halide compound in the solution C is at least 1.2 times of the polyfunctional acid halide compound in the solution B. More specifically, the difference in the concentration ranges from 1.3 times to 5000 times. When the concentration of the solution C is less than 1.2 times of the solution C, the obtained composite reverse osmosis membrane may not have a high salt rejection or a high permeate flow rate. On the other hand, when the concentration of the solution C exceeds 5000 times of the solution B, the properties cannot be improved to match with the difference, and it causes disadvantages in costs and efficiency. The standard of the concentration is not specifically limited, but it can be, for example, based on weight.

Preferably in the producing method, solution B remains partially rejected at a contact with the solution C.

The remaining solution B can be observed visually after a contact with the solution C. A composite reverse osmosis membrane having a high salt rejection and a high permeate flow rate can be obtained even if the solution B does not remain. However, the properties of the composite reverse osmosis membrane can be improved if some solution B remains.

In the present invention, the compound included in the solution A preferably has at least two amino groups and the compound is at least one selected from the group consisting of aromatic polyfunctional amine, aliphatic polyfunctional amine and alicyclic polyfunctional amine.

A preferable aromatic polyfunctional amine is selected from the group consisting of m-phenylenediamine, p-phenylenediamine, 1,3,5-triaminobenzene, 1,2,4,-triaminobenzene, 3,5-diamino benzoic acid, 2,4-diaminotoluene, 2,4-diaminoanisole, amidol, and xylenediamine. These amines can be used either alone or as mixtures thereof.

A preferable aliphatic polyfunctional amine is selected from the group consisting of ethylenediamine, propylenediamine, and tris(2-aminoethyl)amine. These amines can be used either alone or as mixtures thereof.

A preferable alicyclic polyfunctional amine is selected from the group consisting of 1,3-diaminocyclohexane, 1,2-diaminocyclohexane, 1,4-diaminocyclohexane, piperazine, 2,5-dimethylpiperazine, and 4-aminomethylpiperazine. These amines can be used either alone or as mixtures thereof.

The polyfunctional halide compound included in the solution B or C is preferably at least one selected from the group consisting of aromatic polyfunctional acid halide compound, aliphatic polyfunctional acid halide compound and alicyclic polyfunctional acid halide compound.

Preferably, the aromatic polyfunctional acid halide compound is selected from the group consisting of trimesic acid chloride, terephthalic acid chloride, isophthalic acid chloride, biphenyldicarboxylic acid chloride, naphthalenedicarboxylic acid dichloride, benzene trisulfonic acid chloride, benzene disulfonic acid chloride, and chlorosulfonium benzene dicarboxylic acid chloride. These compounds can be used either alone or as mixtures thereof.

Preferably, the aliphatic polyfunctional acid halide compound is selected from the group consisting of propanetricarboxylic acid chloride, butanetricarboxylic acid chloride, pentanetricarboxylic acid chloride, glutaryl halide, and adipoyl halide. These compounds can be used either alone or as mixtures thereof.

Preferably, the alicyclic polyfunctional acid halide compound is selected from the group consisting of cyclopropanetricarboxylic acid chloride, cyclobutanctetracarboxylic acid chloride, cyclopentanetricarboxylic acid chloride, cyclopentanetetracarboxylic acid chloride, cyclohexanetricarboxylic acid chloride, tetrahydrofurantetracarboxylic acid chloride, cyclopentanedicarboxylic acid chloride, cyclobutanedicarboxylic acid chloride, cyclohexanedicarboxylic acid chloride, and tetrahydrofurandicarboxylic acid chloride. These compounds can be used either alone or as mixtures thereof.

Preferably in the present invention, a polyfunctional acid halide compound included in at least either the solution B or C has a hydrophilic group. The hydrophilic group is preferably at least one selected from the group consisting of —COOX, —OH, —SO$_3$X, —OSO$_3$X, —NH$_2$, —NR$_3$Y and —(OCH$_2$CH$_2$)—. 'X' indicates a hydrogen atom, an alkaline metal or —NH$_4$. 'R' indicates a hydrogen atom or an alkyl group, and 'Y' indicates a halogen. Specific examples of these hydrophilic groups include a carboxyl group, a hydroxyl group, a sulfonic group, and an amino group. Among them, a carboxyl group, a sulfonic group, and an amino group are preferred.

Preferably in the method of the invention, the porous support provided with the layer is further contacted with at least either an acidic aqueous solution or an alkaline aqueous solution after the contact with the solution C. The acidic aqueous solution preferably has a pH ranging from 1 to 5 and it contains acidic materials such as phosphoric acid, hydrochloric acid, sulfuric acid and nitric acid. The alkaline aqueous solution has a pH ranging from 8 to 13, and it contains alkaline materials such as sodium hydroxide.

BEST MODE FOR CARRYING OUT THE INVENTION

The present invention will be further explained below.

A compound included in the solution A has at least two reactive amino groups. This compound is not specifically limited but any of the above-mentioned compounds can be used. The solution A is typically an aqueous solution.

The solution A can contain an ingredient(s) besides the amine ingredient. For example, to facilitate formation of a membrane or to improve the properties of the obtained composite reverse osmosis membrane, small amounts of polymers such as polyvinyl alcohol, polyvinyl pyrrolidone and polyacrylic acid, or small amounts of polyhydric alcohols such as sorbitol and glycerol, can be added.

The solution A preferably includes salts, such as amine salts disclosed in JP-A-2-187135. Most preferable are salts comprising organic acids and tetraalkyl ammonium halide or trialkyl amine. These amine salts improve the absorptivity of the solution A in the support and help promote the reaction by facilitating formation of the membrane.

The solution A can contain a surfactant(s) such as sodium dodecylbenzenesulfonate, sodium dodecyl sulfate, and sodium lauryl sulfate. These surfactants are effective in improving the absorption of the solution A onto the porous support.

In the present invention, the material disclosed in JP-A-8-224452, whose solubility parameter ranges from 8 to 14 (cal/cm$_3$)$^{1/2}$, can be included in the solution A or in the reactants of the solutions A, B and C, so that the flux will be further improved.

The solubility parameter is the amount defined by $(\Delta H/V)^{1/2}$ (cal/cm$^3$)$^{1/2}$ when the molar heat of vaporization of a liquid is $\Delta$Hcal/mol, and the molar volume is V cm$^3$/mol.

Materials having the above solubility parameter include, for example, alcohols, ethers, ketones, esters, halogenated hydrocarbons, and sulfur-containing compounds.

The alcohols include, for example, ethanol propanol, butanol butyl alcohol, 1-pentanol, 2-pentanol, t-amyl alcohol, isoamyl alcohol, isobutyl alcohol, isopropyl alcohol, undecanol, 2-ethyl butanol, 2-ethyl hexanol octanol, cydohexanol, tetrahydro furfuryl alcohol, neopentyl glycol, t-butanol, benzyl alcohol, 4-methyl-2-pentanol, 3-methyl-2-butanol, pentyl alcohol, allyl alcohol, ethylene glycol, diethylene glycol, triethylene glycol, and tetraethylene glycol.

The ethers include, for example, anisole, ethyl isoamyl ether, ethyl-t-butyl ether, ethylbenzyl ether, crown ether, cresyl methyl ether, diisoamyl ether, diisopropyl ether, diethyl ether, dioxane, diglycidyl ether, cineol, diphenyl ether, dibutyl ether, dipropyl ether, dibenzyl ether, dimethyl ether, tetrahydropyran, tetrahydrofuran, trioxane, dichloroethyl ether, butyl phenyl ether, furan, methyl-t-butyl ether, monodichlorodiethyl ether, ethylene glycol dimethyl ether, ethylene glycol diethyl ether, ethylene glycol dibutyl ether, ethylene glycol monomethyl ether, ethylene glycol monoethyl ether, ethylene glycol monobutyl ether, diethylene glycol dimethyl ether, diethylene glycol diethyl ether, diethylene glycol dibutyl ether, diethylene glycol monomethyl ether, diethylene glycol monoethyl ether, diethylene glycol monobutyl ether, and diethylene chlorohydrin.

The ketones include, for example, ethyl butyl ketone, diacetone alcohol, diisobutyl ketone, cyclohexanone, 2-heptanone, methyl isobutyl ketone, methyl ethyl ketone, and methyl cyclohexane.

The esters include, for example, methyl formate, ethyl formate, propyl formate, butyl formate, isobutyl formate, isoamyl formate, methyl acetate, ethyl acetate, propyl acetate, butyl acetate, isobutyl acetate, and amyl acetate.

The halogenated hydrocarbons include, for example, allyl chloride, amyl chloride, dichloromethane, and dichloroethane.

The sulfur-containing compounds include, for example, dimethyl sulfoxide, sulfolane, and thiolane.

Among these compounds, alcohols and ethers are especially preferable. These compounds can be used either alone or as mixtures thereof.

Furthermore, for accelerating the polycondensation reaction at the interface, it is effective to use sodium hydroxide or sodium tertiary phosphate in the solution A, which is capable of removing a hydrogen halide formed during the interfacial reaction or to use an acylation catalyst.

Examples of solvents that are preferably used in the solutions B and C include organic solvents immiscible with water. Among the solvents, for example, hydrocarbons (e.g., hexane, heptane, octane, nonane, decane, and cyclohexane) and halogenated hydrocarbons (e.g., carbon tetrachloride, trichlorotrifluoroethane, and difluorotetrachloroethane) are especially preferred.

Polyfunctional acid halide compounds included in the solutions B and C are not specifically limited to the above-identified compounds.

In the present invention, the compound having at least two amino groups and the polyfunctional acid halide compound are interfacially polymerized to form a thin film mainly comprising polyamide (i.e., a polyamide skin layer) on a porous support.

For the solutions A, B and C, concentrations of the compound having at least two amino groups and of the polyfunctional acid halide compound are not specifically limited as long as the concentration ratio of the polyfunctional acid halide in the solution B to that in the solution C is in the predetermined range. Typical concentration of the polyfunctional acid halide compound in the solution B ranges from 0.01 to 5 weight %, or preferably, from 0.05 to 1 weight %. Typical concentration of the polyfunctional acid halide compound in the solution C ranges from 0.02 to 50 weight %, or preferably, from 0.06 to 20 weight %. Typical concentration of the compound having at least two amino groups ranges from 0.1 to 10 weight %, or preferably, from 0.5 to 5 weight %.

The porous support in the present invention is not specifically limited as long as it can support the polyamide skin layer. The support can be made of various materials, for example, polysulfone, polyarylethersulfone such as polyethersulfone, polyimide, and polyvinylidene fluoride. Among them, a porous support film made of polysulfone or polyarylethersulfone is especially preferred because of the chemical, mechanical and thermal stability.

The porous support film is typically about 25–125 μm thick, preferably about 40–75 μm thick, but the thickness is not limited thereto.

A composite reverse osmosis membrane of the present invention is produced from the above-identified materials in the following manner. First, the solution A comprising one or more compounds having at least two amino groups is coated on the porous support so as to form a first layer. On the first layer, the solution B comprising one or more polyfunctional acid halide compounds is coated and subsequently, the solution C is coated thereon. The coated support is heated and dried at about 20 to 150° C. in general, preferably at about 70 to 130° C. for about 1 to 10 minutes, preferably for about 2 to 8 minutes, and thus, a polyamide-based water-permeable thin film (polyamide skin layer) is formed. This thin film is typically about 0.02 to 2 μm in thickness, preferably about 0.1 to 1.0 μm in thickness. This polyamide skin layer typically has internal crosslinking.

In the method of producing a composite reverse osmosis membrane of the present invention, as disclosed in Published Examined Japanese Patent Application No. 63-36803, the obtained composite reverse osmosis membrane can be further chlorinated with hypochlorous acid or the like to improve the salt rejection property.

Examples and Comparative Examples are explained below.

EXAMPLE 1

A solution A was prepared as an aqueous solution containing 2.0 weight % of m-phenylenediamine, 0.15 weight % of sodium lauryl sulfate, 2.0 weight % of triethylamine, 4.0 weight % of camphorsulfonic acid, and 8 weight % of isopropyl alcohol. The solution A was contacted with a porous polysulfone support film, and extra solution was removed. And thus, a film of the solution A was formed on the support film.

Subsequently, an isooctane solution containing 0.12 weight % of trimesic acid chloride (solution B) was contacted with the support film surface. Before the solution B dried, a solution C, which was an isooctane solution containing 0.5 weight % of trimesic acid chloride was contacted with the layer. The reaction mixture was kept in a 120° C. hot air dryer for three minutes in order to form a polyamide skin layer thereon, and thus, a composite reverse osmosis membrane was obtained.

The properties of the composite reverse osmosis membrane was evaluated using pH 6.5 saline water containing 500 ppm of sodium chloride. When the operation pressure was 5 kgf/cm$^{2\cdot}$, the salt rejection was 99.5% and the flux was 1.1 m$^3$/m$^2$·day in terms of permeate conductivity.

The obtained composite reverse osmosis membrane was dried for one hour at 60° C. Distilled water was dropped on the film surface (polyamide skin layer surface) and the contact angle was measured 15 seconds later. The contact angle was 39°.

EXAMPLES 2, 3 AND COMPARATIVE EXAMPLES 1, 2

Composite reverse osmosis membranes were obtained in the same manner as Example 1 except that the concentration of the trimesic acid chloride in the solution C was varied. Properties of these membranes were evaluated in the same manner as Example 1. The results are shown in the following Table 1.

EXAMPLE 4

A composite reverse osmosis membrane was obtained in the same manner as Example 1 except that the support film was contacted with the solution C after the solution B was dried visually. Properties of the membrane were evaluated in the same manner as Example 1. The results are shown in the following Table 1.

TABLE 1

|  | *I (wt %) | Salt rejection (%) | Flux (m$^3$/m$^2$ · day) | Water contact angle (°) |
|---|---|---|---|---|
| Example 2 | 0.25 | 99.5 | 0.9 | 29 |
| Example 3 | 1.0 | 99.5 | 1.0 | 32 |
| Example 4 | 0.50 | 99.5 | 0.8 | 39 |
| Com. Ex. 1 | 0.00 | 93 | 0.7 | 51 |
| Com. Ex. 2 | 0.12 | 97 | 0.7 | 47 |

*I: concentration of polyfunctional acid halide compound in solution C

As described above, for the composite reverse osmosis membranes of the present invention, the water contact angle is 45° or less, and the concentration of the trimesic acid chloride in the solution C is higher (at least 1.2 times) than that of the solution B. As shown in Table 1, the composite reverse osmosis membranes in the Examples have a high flux and a high salt rejection, so they are excellent composite reverse osmosis membranes. These properties are highest for the membranes in the Examples 1, 2 and 3, where the solution C was contacted while the solution B was not dried yet.

On the other hand, the composite reverse osmosis membranes of the Comparative Examples have water contact angles over 45°, and the flux was low.

INDUSTRIAL APPLICABILITY

As mentioned above, composite reverse osmosis membranes of the present invention have salt rejection and water permeability properties exceeding required levels. By using the composite reverse osmosis membrane, components such as salts can be sufficiently separated even at a low operation pressure. Because of the low pressures, water purification equipment can be composed of pipes made of inexpensive materials such as polyvinyl chloride, providing a cost reduction. Moreover, the composite reverse osmosis membrane of the present invention can be used for a domestic water purification apparatus since it can be operated at city water level pressures.

What is claimed is:

1. A composite reverse osmosis membrane comprising:

a porous support; and a polyamide skin layer formed on the porous support, wherein the composite reverse osmosis membrane is produced by a method comprising the steps of:

forming a layer on the porous support by coating a solution A comprising an amino compound having at least two reactive amino groups;

contacting the layer with a solution B comprising a polyfunctional acid halide compound; and subsequently contacting the layer with a solution C comprising the polyfunctional acid halide compound at a concentration higher than a concentration of the polyfunctional acid halide compound in the solution B to form the polyamide skin layer;

and wherein a contact angle between a surface of the polyamide skin layer and water is no more than 45°, sodium chloride rejection is at least 98%, and a permeate flow rate is at least 0.7 m$^3$/m$^2$·day when evaluated by using feed water which has pH 6.5, 0.05 weight % of salt, an operation pressure of 5 kgf/cm$^2$ and a temperature of 25° C.

2. The composite reverse osmosis membrane according to claim 1, wherein the contact angle is no more than 40°.

3. The composite reverse membrane according to claim 1, wherein the sodium chloride rejection is at least 98% and the permeate flow rate is at least 0.8 m$^3$/m$^2$ day.

4. The composite reverse osmosis membrane according to claim 1, wherein the concentration of the polyfunctional acid halide compound in the solution C is at least 1.2 times the concentration of the polyfunctional acid halide compound in the solution B.

5. The composite reverse osmosis membrane according to claim 1, wherein the solution C is applied to the layer before the solution B is completely dried on the layer.

* * * * *